US005235391A

United States Patent [19]

Aimoto

[11] Patent Number: 5,235,391

[45] Date of Patent: Aug. 10, 1993

[54] IMAGE FORMING APPARATUS PROVIDED WITH AUTOMATIC DISCHARGING MECHANISM

[75] Inventor: Toyoka Aimoto, Nara, Japan

[73] Assignee: Sharp Kabushiki Kaisha, Osaka, Japan

[21] Appl. No.: 918,495

[22] Filed: Jul. 22, 1992

[30] Foreign Application Priority Data

Jul. 29, 1991 [JP] Japan .................................. 3-188731

[51] Int. Cl.[5] .............................................. G03B 15/08

[52] U.S. Cl. .................................... 355/269; 355/208; 355/245

[58] Field of Search ............... 355/260, 245, 246, 269, 355/270, 298, 297, 203, 204, 208; 222/DIG. 1

[56] References Cited

U.S. PATENT DOCUMENTS

| | | | |
|---|---|---|---|
| 4,358,196 | 11/1982 | Mugrauer | 355/246 |
| 4,625,895 | 12/1986 | Tsukano | 355/260 X |
| 4,634,286 | 1/1987 | Pike | 355/245 X |
| 4,891,671 | 1/1990 | Iwanasa | 355/245 |
| 4,891,673 | 1/1990 | Buell | 355/245 |
| 4,932,355 | 6/1990 | Neufeld | 355/246 X |
| 5,095,338 | 3/1992 | Hayes | 355/246 |

FOREIGN PATENT DOCUMENTS

| | | |
|---|---|---|
| 0086875 | 5/1982 | Japan . |
| 61-39061 | 2/1986 | Japan . |

*Primary Examiner*—A. T. Grimley
*Assistant Examiner*—Matthew S. Smith
*Attorney, Agent, or Firm*—David G. Conlin; George W. Neuner

[57] ABSTRACT

An image forming apparatus is constructed to have a developing bath for storing developing powder, a recovery vessel for recovering degraded developing powder, a discharging shutter for shutting an opening formed on the bottom of the developing bath, and a carrying mechanism for carrying the degraded developing powder to the recover vessel. The discharging shutter is provided between the opening of the developing bath and the entry of the carrying mechanism so that no developing powder may be prevented from being jammed in the carrying mechanism.

2 Claims, 2 Drawing Sheets

IMAGE FORMING APPARATUS PROVIDED WITH AUTOMATIC DISCHARGING MECHANISM

BACKGROUND OF THE INVENTION

1. Field of the Invention

The present invention relates to an image forming apparatus of an electronic photography type such as a copying machine and a laser printer, and more particularly to the image forming apparatus which is capable of automatically deserting developing powder stored in a developing bath.

2. Description of the Related Art

The inventors of the present application know a mechanism for recovering developing powder. This known recovery mechanism includes a screw for carrying the developing powder into a developing bath. The screw operates to carry the degraded developing powder to a recovery vessel.

The inventors of the present application know another mechanism for recovering degraded developing powder. This known recovery mechanism includes a tabular discharging shutter provided on the bottom of a developing bath. By pulling the discharging shutter out of the developing bath, the degraded developing powder is allowed to be discharged.

The former known mechanism has the following disadvantages, because it provides the carrying screw inside of the developing bath.

(1) In a case that the screw is stopped in doing a copying operation and is started in discharging the developing powder, the stationary developing powder appears near the screw. The pool of the stationary powder makes the density of the developing powder in the bath shifted, that is, cannot offer a uniform density on the overall copied paper.

(2) In a case that the screw is driven in doing a copying operation and deserting the developing powder, the screw operates to shift the developing powder toward a deserting side of the developing bath. This results in disabling to output the developing powder on a magnet roller and varying the overall density of the developing powder.

The latter known mechanism has the following disadvantage. That is, this mechanism is constructed to exchange the developing powder by opening and shutting the shutter on the bottom of the developing bath. In the space around the screw and a pipe from the screw to the vessel, the developing powder is jammed. Hence, it is difficult to smoothly exchange the developing powder at the next time.

Further, the inventors of the present application know that a toner density sensor may be added to the mechanism. The toner density sensor serves to sense the developing powder and sends a sensing signal. Based on the sensing signal, it is determined whether or not the exchange of the toner is terminated. In a case that, however, the developing powder is left at the bottom of the developing bath, the new developing powder is mingled into the left developing powder, resulting in lowering the quality of the image.

As another disadvantage of the latter known mechanism, when the developing powder is dropped into the recovery vessel by opening the shutter, the powder may be splashed here and there. The user may soil his or her hands with the splashed powder.

SUMMARY OF THE INVENTION

It is an object of the present invention to provide an image forming apparatus which is capable of keeping the density of the developing powder uniform so that the quality of the resulting image may be enhanced.

In carrying out the object, according to a first aspect of the invention, an image forming apparatus includes a developing bath; a recovery vessel for recovering degraded developing powder from the developing bath; a discharging shutter for shutting an opening formed on the bottom of the developing bath; and means for carrying the degraded developing powder to the recovery vessel, the means being located under the discharging shutter.

According to a second aspect of the invention, an image forming apparatus further includes a control unit, the control unit having; means for determining a degrading period of the developing powder stored in the developing bath; means for sensing the developing powder in the developing bath; means for releasing the discharging shutter if the developing powder is determined to be degraded in the determining means and closing the discharging shutter in response to a signal indicating no developing powder, sent from the sensing means; and means for controlling the carrying means for a predetermined time after the exhausting shutter is closed.

In operation, if it is determined that the developing powder enters into a degrading period in light of the number of copies, the shutter control means operates the shutter driving mechanism. By pulling the discharging shutter toward the side of the user, the developing powder is dropped out of the opening of the developing bath and is guided into the recovery vessel.

If all the developing powder is recovered in the developing bath, the shutter is shut. The carrying mechanism is allowed to be driven for a predetermined time after the shutter is closed, that is, until all the developing powder is deserted from the recovery path. Hence, it is possible to prevent the degraded developing powder from being jammed in the space around the screw and the recovery pipe.

In the apparatus according to the first aspect of the invention, the shutter is provided between the opening of the developing bath and the entry of the screw. This location of the shutter prevents the developing powder from being jammed around the screw so that all the developing powder may be efficiently stirred. This results in keeping the density uniform.

In the apparatus according to the second aspect of the invention, the screw is rotated for a predetermined time after the shutter is shut. No developing powder is left in the pipe and the screw so as to prevent the powder from being jammed therein.

Further objects and advantages of the present invention will be apparent from the following description of the preferred embodiment of the invention as illustrated in the accompanying drawings.

DESCRIPTION OF THE PREFERRED EMBODIMENTS

Figure 1:
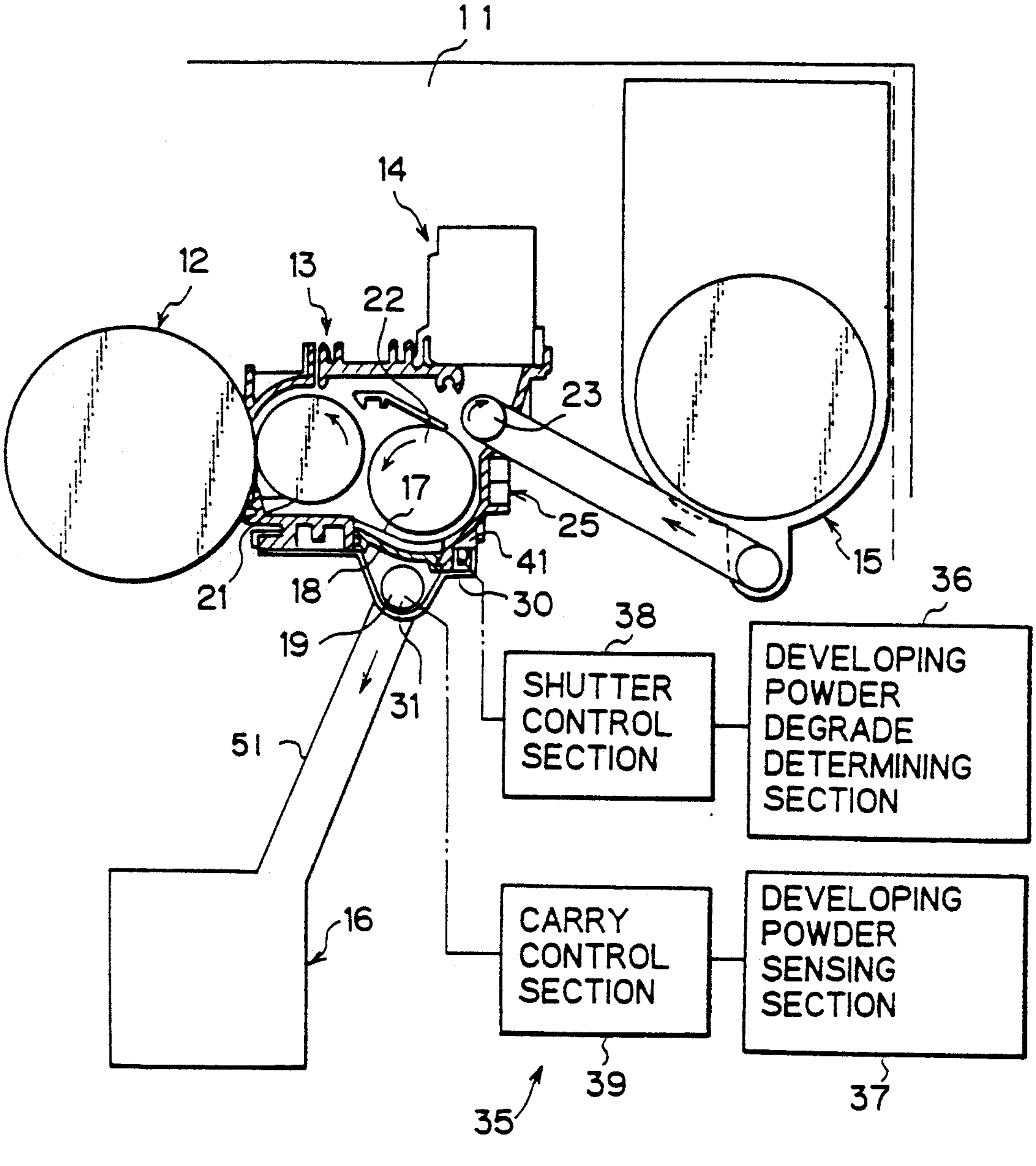
FIG. 1 is a view showing an image forming apparatus according to an embodiment of the present invention.
Figure 2:
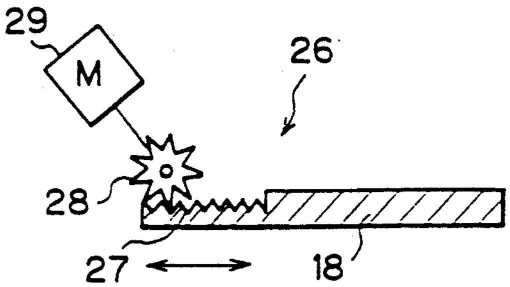
FIG. 2 is a view showing a driving mechanism of a shutter included in the embodiment shown in FIG. 1.
Figure 3:
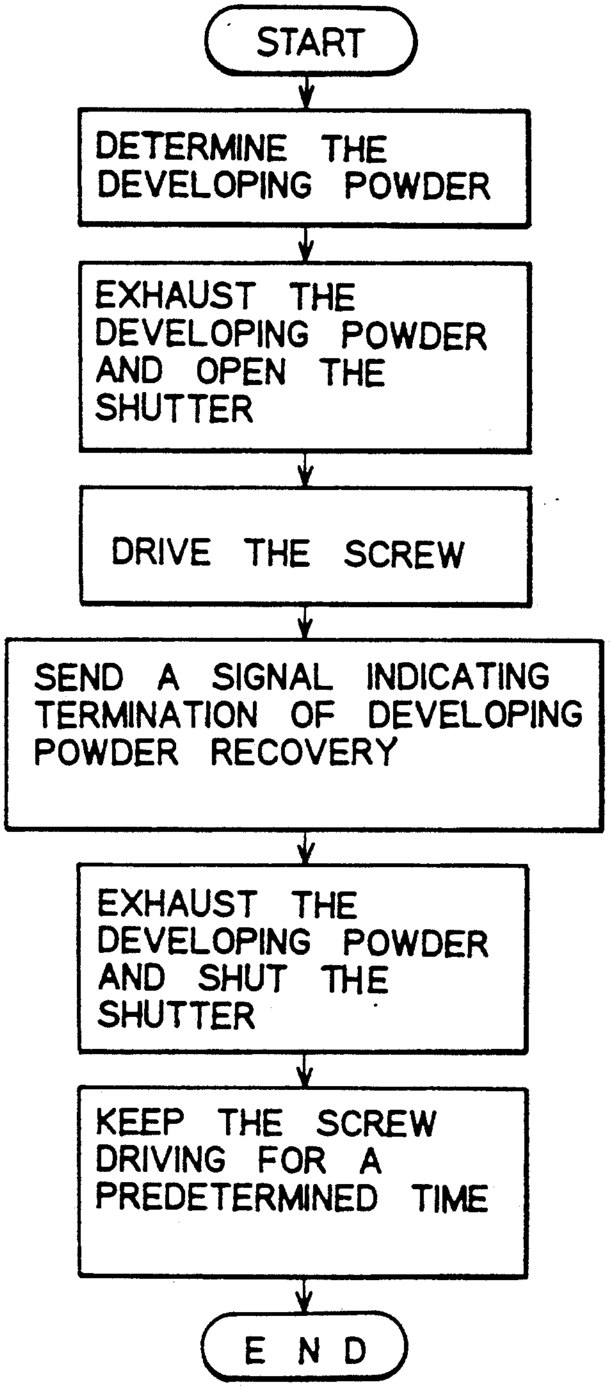
FIG. 3 is a flowchart showing a control for recovering degraded developing powder.

FIG. 1 is a view showing an image forming apparatus according to an embodiment of the present invention. FIG. 2 is a view showing a shutter driving mechanism. FIG. 3 is a flowchart showing the control of recovering the degraded developing powder.

As shown, the image forming apparatus is constructed to have a developing bath 13 located around a photosensitive body 12 of a main body 11, a toner feeding bath 14 for feeding toner to the developing bath 13, a developing powder feeding bath 15 for feeding the developing powder to the developing bath 13, a recovery vessel 16 for recovering the degraded developing powder from the developing bath 13, a discharging shutter 18 for opening and closing or shutting an opening formed on the bottom of the developing bath 13, and a carrying mechanism 19 located under the discharging shutter 18 and for carrying the degraded developing powder to a recovery vessel 16.

The developing bath 13 includes a magnet roller 21 and stirring rollers 22, 23 fitted therein. The toner feeding bath 14 and the developing powder feeding bath 15 are located in the upper portion of the developing bath 13. In response to a signal from a toner density sensor 25, toner feeding bath 14 serves to feed the toner to the developing bath 13.

As shown in FIG. 2, the discharging shutter 18 located under the developing bath 13 is opened or shut by the shutter driving mechanism 26. The driving mechanism 26 is constructed to have a rack 27 formed on one side of the shutter 18, a pinion 28 mating with the rack 27, and a motor 29 for rotating the pinion 28. The carrying mechanism 19 is constructed to have a screw 31 rotatably supported on a bed plate 30 of the main body 11 and a motor (not shown) for rotating the screw 31.

A numeral 35 denotes a control unit for controlling the discharging shutter 18 and the carrying mechanism 19. The control unit 35 includes a developing powder degrade determining section 36 for determining whether or not the developing powder in the developing bath 13 enters into a degrading period, a developing powder sensing section 37 for sensing the developing powder in the developing bath 13, a shutter control section 38 for releasing the discharging shutter 18 is based on the degrade determined result sent from the section 36 and shutting the discharging shutter 18 based on a termination signal sent from the developing powder sensing section 37, and a carry control section 39 for driving the carrying mechanism 19 for a predetermined time after the discharging shutter 18 is shut.

The developing powder degrade determining section 36 is composed of a counter for counting a number of copies, for example. The developing powder sensing section 37 is composed of the toner density sensor 25. The shutter control section 38 is arranged to have a commercially available one-chip microcomputer and the shutter driving mechanism 26 controlled by the section 38 itself. The carry control section 39 is composed of a microcomputer for controlling the carrying mechanism 19.

A numeral 41 denotes a sensor for sensing the opening or shutting state of the discharging shutter 18. This sensor is located on the bottom of the developing bath 13. This sensor 14 is composed of an optical sensor and mechanism switches.

In the foregoing construction, if it is determined that the developing powder enters into a degrading period based on the number of copies, the shutter control unit 38 operates the shutter driving mechanism 26 so that the discharging shutter 18 may be pulled toward the side of a user. The right and the left ends of the shutter 18 are formed like a hook so that the shutter 18 may be fitted in the developing bath 13 along the longer side of the bath 13. By pulling the shutter 18, therefore, the developing powder is dropped from the opening 17 of the developing bath 13 into the space located on the screw 31 and the bed plate 30. At this time, the magnet roller 21, the stirring rollers 22, 23 and the screw 31 are driven in concert so as to guide the developing powder in the developing bath 13 into the recovery vessel 16.

If it is determined that all the developing powder in the developing bath 13 is recovered based on the signal from the toner density sensor 25, the discharging shutter 18 is shut. The shut of the discharging shutter 18 is sensed by the sensor 41. Then, the carrying mechanism 19 serves to rotate the screw 31 for a predetermined time, that is, until all the developing powder is exhausted from the recovery path. Hence, no degraded developing powder is left in the space around the screw 13 and the recovery pipe 51.

As described above, the shutter 18 is provided between the opening 17 of the developing bath 13 and the entry of the screw 31. The location of the shutter 18 prevents the developing powder from being jammed in the space around the screw 31. This results in efficiently stirring all the developing powder for keeping the density uniform.

After the shutter 18 is shut, the screw 31 is kept rotated for a predetermined time. Hence, no developing powder is left and jammed inside of the pipe 51 and the space around the screw 31.

After recovering the degraded developing powder, the new developing powder and toner are fed into the developing bath. This is the termination of the exchange of the developing powder.

The foregoing embodiment has been constructed to locate the developing bath 13 and the screw 31 in respective places. As another construction, the screw 31 may be located in the developing bath 13 and the shutter 18 may be located inside of the developing bath.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image forming apparatus comprising:

a developing bath for storing a developing powder;

a recovery vessel for recovering degraded developing powder from said developing bath;

a discharging shutter for opening and closing an opening formed on a bottom of said developing bath;

a carrying means disposed under said discharging shutter for carrying said degraded developing powder into said recovery vessel;

means for sensing a presence of the developing powder in said developing bath; and a control unit for controlling operations of said discharging shutter and said carrying means, said control unit including means for determining a degrading time of the developing powder stored in said developing bath, a shutter control means for causing said discharging shutter to open said opening based on the degrading time determined by said determining means and for causing said discharging shutter to close said opening based on a sensed result by said means for sensing a presence of the developing powder in said developing bath, the sensed result indicating no presence of the developing powder, and a carrying control means for controlling the driving operation of said carrying means for a predetermined time after closing of said opening by said discharging shutter.

2. An image forming apparatus according to claim 1, wherein said carrying means is located inside of said developing bath.

* * * * *